United States Patent [19]

Kroll

[11] 3,758,829

[45] Sept. 11, 1973

[54] VERSATILE MODULAR ENCLOSURE WITH EXTRUDED WALL SECTIONS

[75] Inventor: Arthur W. Kroll, Wethersfield, Conn.

[73] Assignee: Veeder Industries, Inc., Hartford, Conn.

[22] Filed: Feb. 8, 1971

[21] Appl. No.: 113,266

[52] U.S. Cl........... 317/117, 317/101 DH, 317/120, 312/257 R

[51] Int. Cl............................................... H02b 1/10

[58] Field of Search....................... 174/66; 312/111, 312/257 R, 257 SM, 257 A, 263, 264; 317/101 C, 101 B, 101 DH, 117, 118, 120

[56] References Cited

UNITED STATES PATENTS

| | | | |
|---|---|---|---|
| 3,265,935 | 8/1966 | Rosa | 317/101 DH |
| 3,377,515 | 4/1968 | Erb | 317/101 DH |
| 2,561,426 | 7/1951 | Stearn | 317/99 X |
| 3,279,871 | 10/1966 | Bright | 317/120 X |

*Primary Examiner*—Lewis H. Myers
*Assistant Examiner*—Gerald P. Tolin
*Attorney*—Prutzman, Hayes, Kalb & Chilton

[57] ABSTRACT

An enclosure for electrical equipment having modular side and divider panel extrusions forming two separate compartments with opposed supporting rails. Front and rear face plates are fastened to the ends of the side and divider extrusions to provide a rigid supporting frame, and a pair of opposed carriage extrusions are mounted on opposed supporting rails in one of the compartments for supporting an electrical package in that compartment, and a plurality of printed circuit boards are mounted on opposed supporting rails in the other compartment.

4 Claims, 3 Drawing Figures

PATENTED SEP 11 1973

3,758,829

INVENTOR
ARTHUR W. KROLL

BY Brutzman, Hayes, Kalb and Chilton
ATTORNEYS

VERSATILE MODULAR ENCLOSURE WITH EXTRUDED WALL SECTIONS

BRIEF SUMMARY OF THE INVENTION

The present invention relates to electrical equipment enclosures and more particularly to an electrical equipment enclosure employing extruded parts which may be selectively assembled with sheet metal parts to provide a boxlike enclosure of the desired height, width, and depth.

It is a principal aim of the present invention to provide a new and improved electrical equipment enclosure having a minimum number of parts adapted for being selectively used for constructing an electrical equipment enclosure of the desired dimensions.

It is another aim of the present invention to provide new and improved modular extrusions for an electrical equipment enclosure providing versatility in selecting the height and depth of the enclosure and for constructing an enclosure with one or two or more separate equipment compartments.

It is another aim of the present invention to provide a new and improved electrical equipment enclosure for mounting PC boards in combination with other electrical equipment.

It is another aim of the present invention to provide a new and improved electrical equipment enclosure facilitating removal of the enclosed electrical equipment for repair, etc.

Other objects will be in part obvious and in part pointed out more in detail hereinafter.

A better understanding of the invention will be obtained from the following detailed description and the accompanying drawing of an illustrative application of the invention.

DESCRIPTION OF THE PREFERRED EMBODIMENT

Figure 1:
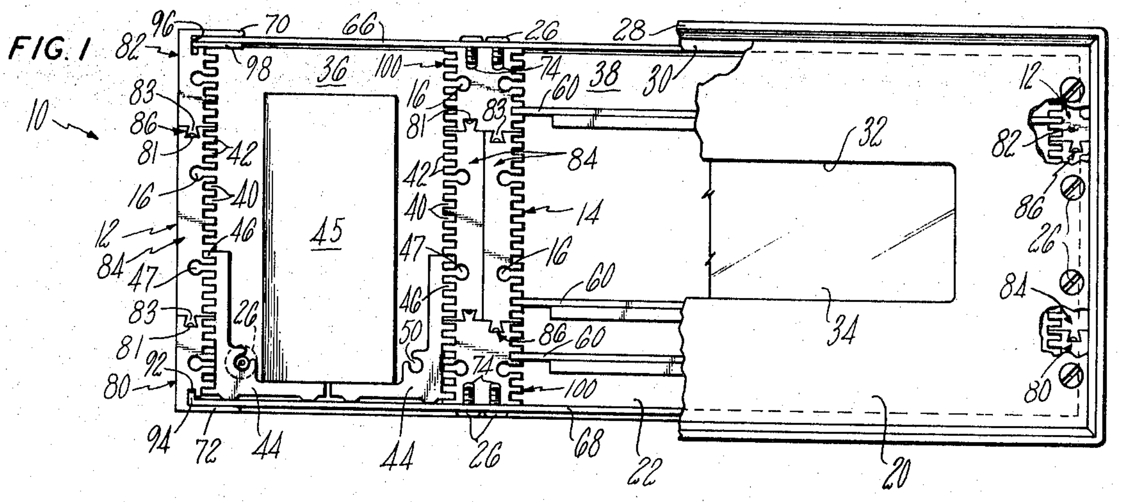
FIG. 1 is a front elevation view, partly broken away, of an embodiment of versatile electrical equipment enclosure incorporating the present invention.
Figure 2:
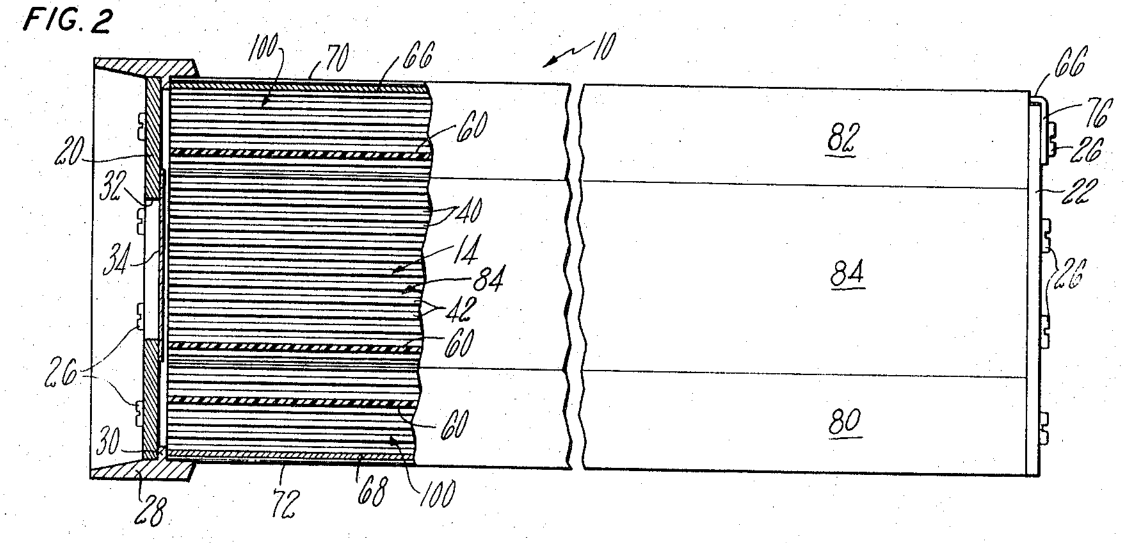
FIG. 2 is a side elevation view, partly broken away and partly in section, of the enclosure.

Referring now to the drawing in detail wherein like numbers are used to designate like parts, an embodiment 10 of a versatile electrical equipment enclosure incorporating the present invention comprises a pair of parallel extruded side panels 12 and an extruded divider panel 14 mounted parallel to and intermediate of the side panels 12.

Each of the extruded side and divider panels 12, 14 has a plurality of equally spaced partially circular extruded slot openings 16 and the enclosure comprises a pair of front and rear face plates 20, 22 which are secured to the ends of the extrusions 12, 14 by suitable self-tapping machine screw fasteners 26 extending through openings in the face plates 20, 22 and threaded into the ends of the extruded openings 16. A bezel 28 is shown provided for framing the front face plate 20 and the bezel 28 has an inner lip or flange 30 for receipt between the front face plate 20 and extrusions 12, 14 for clamping the bezel 28 in place. The front face plate 20 is shown having an enlarged rectangular opening 32 and a transparent window 34 (constructed of transparent plastic for example) is shown secured to the inner face of the front face plate 20 overlying the opening 32 for example for reading a counter (not shown) forming a part of the electrical equipment mounted within the enclosure.

The extrusions 12, 14 are preferably made of aluminum and the front and rear face plates 20, 22 are preferably made of relatively heavy sheet stock for providing with the extrusions 12, 14 a strong and rigid enclosure frame. The height and width of the front and rear face plates 20, 22 is determined in accordance with the desired height and width of the enclosure. The extruded side and divider panels 12, 14 extend substantially the full length of the modular enclosure and are cut to length from suitable extrusions in accordance with the desired enclosure depth. The divider extrusion 14 provides for dividing the enclosure into two separate electrical equipment compartments 36, 38 and is suitably positioned between the side extrusions 12 to provide the desired compartment widths.

The side and intermediate extrusions 12, 14 have a plurality of evenly spaced extruded slot openings 40 (and the extruded slot openings 16 form an extension of some of the extruded slot openings 40) providing a plurality of evenly spaced pairs of opposed supporting rails 42 (which preferably have substantially the same thickness as the slot openings 40) in each compartment 36, 38 for supporting electrical equipment therein. A pair of opposed generally L-shaped carriage extrusions 44 are mounted within the compartment 36 and each of the carriage extrusions 44 has a plurality of extruded lips or flanges 46 adapted to be snugly received within the slot openings 40 for supporting the carriage extrusion on the rails 42. Also, a partly cylindrical end extrusion or key 47 is provided on the end of one of the carriage flanges 46 for being received within a panel opening 16 for keying the carriage extrusion to the panel. The opposed L-shaped carriage extrusions 44 are shown employed for supporting an electrical equipment package 45 and in effect provide a drawer for withdrawing the electrical equipment package 45 as desired (either forwardly by first removing the front face plate 20 or rearwardly by first removing the rear face plate 22). Also, the carriage extrusions 44 are provided with extruded openings 50 for securing the carriage (with screw fasteners 26) to the rear face plate 22 and/or the front face plate 20 in the manner the extrusions 12, 14 are secured to the face plates 20, 22. The electrical equipment package 45 may be secured to the carriage extrusions 44 and/or directly to the front and/or back face plates 20, 22. The carriage extrusions 44 may be mounted at any level within the enclosure as desired (with the partially cylindrical keys 47 received within any opposed pair of extruded panel openings 16) for positioning the electrical equipment package 45 relative to any additional components mounted in the compartment 36 above or below the package 45. Also, the carriage extrusions 44 are cut to length from a suitable length extrusion in accordance with the depth of the package 45 or, for maximum support, to have a length equal to the length of the extrusions 12, 14.

The pairs of opposed rails 42 are designed to be employed for supporting printed circuit (PC) boards as shown in FIG. 1. The PC boards 60 may be vertically spaced as desired and in accordance with the height of the electrical equipment supported thereon. The PC boards 60 may be readily removed merely by removing the front or back face plate 20, 22 and sliding the PC board out the opening. Thus, by merely removing either the front or back face plate 20, 22 all of the electrical equipment contained in the enclosure 10 may be readily withdrawn for repair, etc.

A sheet metal top cover plate 66 and a sheet metal bottom cover plate 68 provide for completing the enclosure. The side edges of the top and bottom cover plates 66, 68 are received under laterally inwardly extending lips 70, 72 forming the upper and lower edges of the side extrusions 12 and for thereby providing a clean corner configuration and with the top and bottom cover plates spaced slightly inwardly of the upper and lower edges of the enclosure 10. The intermediate extrusion 14 has a height slightly less than the height of the side extrusions 12 and has a pair of laterally spaced extruded slots 74 at the upper and lower edges thereof for receiving screws 26 for securing the covers 66, 68 in place. The covers 66, 68 have a width in accordance with the lateral spacing of the side extrusions 12 and the bottom cover 68 has a length equal to the length of the extrusions 12, 14 and is mounted in abutment with the rear face plate 22. The top cover 66 has a downwardly turned rear lip 76 which overlaps the upper edge of the rear face plate 22 and has suitable openings for receiving screw fasteners 26 for securing the top cover 66 with the rear face plate 22 to the side and divider extrusions 12, 14. Thus, if desired the top cover 66 may be readily removed by withdrawing it rearwardly after removing its securing fasteners 26 to provide access to the compartments 36, 38.

Figure 3:
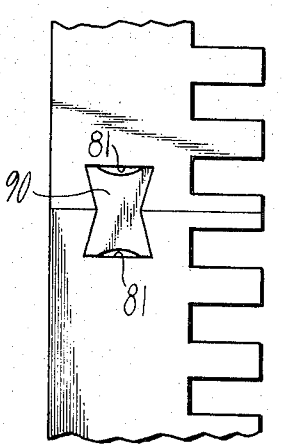
FIG. 3 is an enlarged front elevation view, partly broken away, showing a modified dovetail connection for the side and divider extrusions of the enclosure.

The extrusions 12, 14 are of modular construction. The side extrusions 12 are shown comprising a "female" lower edge extrusion 80 (with a "female" dovetail edge connection 81) and a "male" upper edge extrusion 82 (with a "male" dovetail edge connection 83) and a single intermediate extrusion 84. The sections extrusions 80, 82 and 84 are joined by dovetail connections 86 and such that the intermediate extrusion 84 has a lower "male" dovetail edge connection 83 coacting with the upper "female" dovetail edge connection 81 of the extrusion 80 and an upper "female" dovetail edge connection 81 coacting with the lower "male" dovetail edge connection 83 of the extrusion 82. If desired, the extrusions 80, 82 may be made identical and be provided with either "male" or "female" dovetail connecting edges in which case the intermediate extrusion 84 would have the same form of dovetail connecting edges along both of its opposed edges. Also, for example, if the edge and intermediate extrusions had "female" dovetail edge connections 81, a suitable generally hourglass-shaped "double male" connector extrusion 90 would be employed to join the extrusions 80, 82, 84 together as shown in FIG. 3.

The lower edge extrusion 80 is provided with a generally L-shaped slot 92 for receiving the bottom cover 68 and the bottom cover 68 is formed with upturned side edges 94 for receipt in the L-shaped slots for assisting in the assembly of the lower edge extrusions 80 with the bottom cover 68 as a first step in the construction of the enclosure. The upper edge extrusion 82 is shown having an enlarged slot 96 (for simplifying the extrusion) and elongated shims or wedges 98 are provided under the lateral edges of the top cover 66 for securely fitting the top cover into the enlarged slot 96.

The divider extrusion 14 comprises a pair of vertically spaced identical edge extrusions 100 having a pair of laterally spaced "male" and "female" dovetail edge connections 83, 81. A pair of back-to-back intermediate extrusions 84 are secured between the edge extrusions 100 by the dovetail connections 86. Thus, the modular side and divider extrusions 12, 14 are provided by only four different extrusion modules or alternatively by three different extrusion modules (plus an hourglass-shaped connector extrusion 90 where the extrusions 80, 82, 84 have "female" dovetail connecting edges). Also, the carriage extrusions 44 provide a drawer type support where desired. The extrusions are cut to length in accordance with the desired enclosure depth and the extrusion modules are assembled to provide an enclosure of the desired height (using one or more intermediate extrusions 84) and without or with one or more divider extrusions 14 as desired.

As will be apparent to persons skilled in the art, various modifications, adaptations and variations of the foregoing specific disclosure can be made without departing from the teachings of the present invention.

I claim:

1. A boxlike electrical equipment enclosure comprising a pair of laterally spaced generally parallel elongated modular side panels, at least one elongated modular divider panel intermediate the side panels and extending parallel thereto for dividing the enclosure into separate compartments, structure means rigidly securing the modular side and divider panels in laterally spaced generally parallel relationship comprising generally flat top and bottom cover panels extending between the side panels, the divider panel having on both side faces thereof and each side panel having on the inner face thereof a plurality of longitudinally extending slots so as to form a plurality of pairs of opposed support rails for supporting electrical equipment in each of said separate compartments, each of said side panels comprising first and second elongated side panel edge extrusions forming upper and lower edges of the side panel and having conforming male and female inner dovetail edge connections on the inside edges thereof and laterally inwardly extending lateral lip edges on the outside edges thereof overlying the lateral edges of the top and bottom cover panels respectively, and at least one elongated intermediate section extrusion with conforming male and female dovetail edge connections on opposite edges thereof having an interfitting dovetail connection with the first and second edge extrusions to form a side panel of a selected height, and the divider panel comprising a pair of elongated divider edge extrusions each having a pair of laterally spaced male and female dovetail connections on the inside edges thereof, and at least one pair of said intermediate section extrusions in back-to-back relationship having an interfitting dovetail connection with the pair of divider edge extrusions to form a divider panel having a height related to the height of the side panel, the side panel edge extrusions and side panel intermediate section extrusions having said longitudinally extending slots on said inner side faces thereof and the divider edge extrusions and the pair of back-to-back intermediate section extrusions of the divider panel having said longitudinally extending slots on both side faces thereof to form said plurality of pairs of opposed support rails.

2. A boxlike electrical equipment enclosure comprising a pair of elongated laterally spaced modular side panels, each having a plurality of extrusions, with opposed faces having spaced longitudinally extending slots forming a plurality of pairs of opposed support rails for supporting electrical equipment, rigid front and rear face plates having fastener openings therein, self-tapping threaded fasteners received in the front and rear face plates and threaded into the ends of the longitudinally extending slots of the side panels for rigidly securing the front and back face plates to the side panels for providing a rigid supporting frame, and a pair of opposed generally L-shaped elongated carriage extrusions having longitudinally extending outer flange means mounted on opposed support rails for mounting the carriage extrusions thereon for providing a supporting drawer for electrical equipment.

3. A boxlike electrical equipment enclosure comprising a pair of elongated laterally spaced side panels with opposed faces having spaced longitudinally extending slots forming a plurality of pairs of opposed support rails for supporting electrical equipment, means rigidly securing the side panels in laterally spaced relationship, and a pair of opposed generally L-shaped elongated carriage member extrusions having longitudinally extending outer flange means mounted on opposed support rails for mounting the carriage member extrusions thereon for providing a supporting drawer for electrical equipment.

4. A boxlike electrical equipment enclosure comprising a pair of laterally spaced generally parallel longated modular side panels, at least one elongated modular divider panel intermediate the side panels and extending parallel thereto for dividing the enclosure into separate compartments, and structure means rigidly securing the modular side and divider panels in laterally spaced generally parallel relationship, the divider panel having on both side faces thereof and each side panel having on the inner face thereof a plurality of longitudinally extending slots so as to form a plurality of pairs of opposed support rails for supporting electrical equipment in each of said separate compartments, each side and divider panel comprising a plurality of interfitting extrusions, the divider panel comprising a pair of like divider edge extrusions each having a pair of laterally spaced male and female dovetail connections on the inner edge thereof, and at least one pair of like elongated intermediate section extrusions, each having male and female dovetail edge connections on opposite edges thereof, in back-to-back relationship and having interfitting dovetail connections with the divider edge extrusions to provide a substantially integral divider panel, the pair of back-to-back intermediate section extrusions having said longitudinally extending slots on the side faces thereof and the elongated divider edge extrusions having said longitudinally extending slots on both side faces thereof to form said support rails.

* * * * *